United States Patent [19]
Kappele

[11] Patent Number: 5,273,573
[45] Date of Patent: Dec. 28, 1993

[54] SPECIFIC DYE SET FOR THERMAL INK-JET PRINTING ON PAPER

[75] Inventor: William D. Kappele, Loveland, Colo.

[73] Assignee: Hewlett-Packard Company, Palo Alto, Calif.

[21] Appl. No.: 929,733

[22] Filed: Aug. 13, 1992

[51] Int. Cl.$^5$ ............................................. C09D 11/02
[52] U.S. Cl. ............................... 106/22 R; 106/22 K
[58] Field of Search .............. 106/20, 22, 22 R, 22 K

[56] References Cited

U.S. PATENT DOCUMENTS

| | | | |
|---|---|---|---|
| 3,951,668 | 4/1976 | Schumacher et al. | 106/20 |
| 4,062,688 | 12/1977 | Schumacher | 106/22 |
| 4,505,749 | 3/1985 | Konekiyo et al. | 106/22 |
| 4,554,555 | 11/1985 | Aruga et al. | 106/20 |
| 4,761,180 | 8/1988 | Askeland et al. | 106/22 |
| 4,818,285 | 4/1989 | Causley et al. | 106/22 |
| 4,994,110 | 2/1991 | Stoffel et al. | 106/22 |
| 5,017,227 | 5/1991 | Koike et al. | 106/22 |
| 5,108,504 | 4/1992 | Johnson et al. | 106/22 |
| 5,118,350 | 6/1992 | Prasad | 106/22 |
| 5,135,571 | 8/1992 | Shirota et al. | 106/22 |
| 5,143,547 | 9/1992 | Kappele | 106/22 |
| 5,145,519 | 9/1992 | Kappele | 106/22 |

*Primary Examiner*—Helene Klemanski

[57] ABSTRACT

A specific dye set, comprising Acid Yellow 23, Acid Red 52, and Acid Blue 9, yields true, vivid colors on special coated paper. This dye set, which is intended for 180 dpi thermal ink-jet printers, such as Hewlett-Packard's PaintJet ® printer, is a distinct improvement over a prior art dye set.

8 Claims, 1 Drawing Sheet

SPECIFIC DYE SET FOR THERMAL INK-JET PRINTING ON PAPER

CROSS-REFERENCE TO RELATED APPLICATIONS

The present application is related to patent applications Ser. No. 07/749,740, filed Aug. 26, 1991, now U.S. Pat. No. 5,143,547 and Ser. No. 07/807,924, filed Dec. 16, 1991, now U.S. Pat. No. 5,145,519 both commonly owned by the same assignee as the present application.

TECHNICAL FIELD

The present invention relates to thermal ink-jet printing, and, in particular, to a specific dye set suitable for use with special coated paper used in Hewlett-Packard's PaintJet ® printer.

BACKGROUND ART

In a commercially available thermal ink-jet printer, known as PaintJet ® and available from Hewlett-Packard Company, Palo Alto, Calif., yellow, magenta, and cyan colors are provided by inks containing a specific dye set; yellow, magenta, and cyan colors are provided by inks containing Direct Yellow 86, Direct Red 227, and Acid Blue 9, respectively.

This dye set yields a small color gamut in concentration ranges suitable for the thermal ink-jet pen when jetted onto the special coated paper used in that printer.

It is desirable to provide a dye set that can be used with the special coated paper used in the PaintJet ® printer to provide vivid, true colors and a large color gamut.

DISCLOSURE OF INVENTION

In accordance with the invention, a specific dye set, comprising Acid Yellow 23, Acid Red 52, and Acid Blue 9 yields true, vivid colors on coated paper. The color print quality on coated paper is superior to the prior art dye set. Specifically, the dye set of the invention provides colors with higher Munsell chroma (more vivid colors) and more correct Munsell hue (truer colors) than the dye set of the prior art.

BRIEF DESCRIPTION OF THE DRAWINGS

The sole Figure is a color gamut comparison on Munsell coordinates, comparing the dye set of the invention with a dye set of the prior art on special coated paper.

BEST MODES FOR CARRYING OUT THE INVENTION

Figure 1:
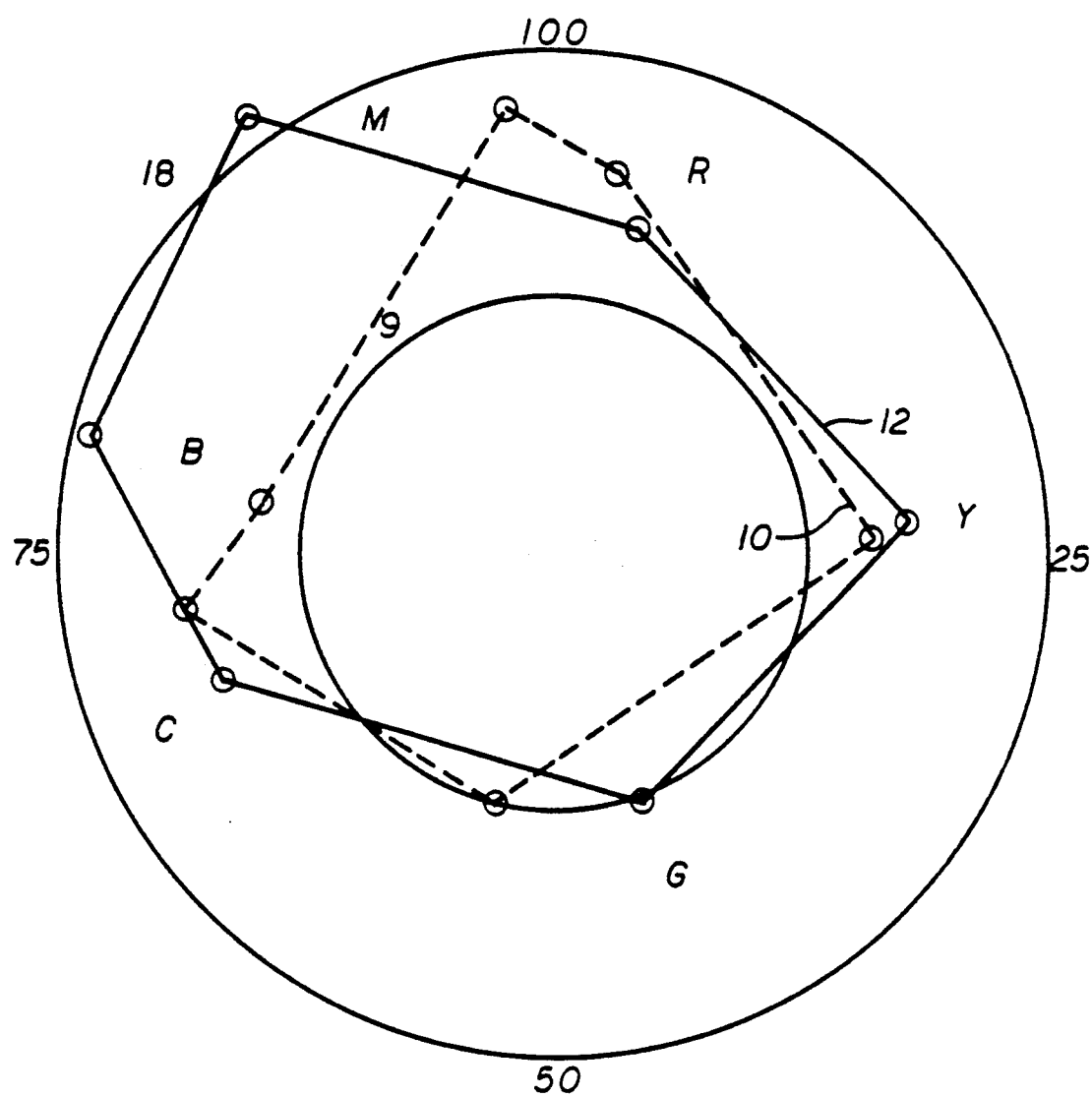

The following invention is directed to a specific dye set for use with a 180 dot-per-inch (dpi) thermal ink-jet printer, such as Hewlett-Packard's PaintJet ® printer. It provides results that are superior to another dye set presently used on such a printer. The present dye st would also work fine on 300 dpi printers.

The dye set of the invention comprises inks containing Acid Yellow 23, Acid Red 52, and Acid Blue 9. Black ink is provided by an ink containing Food Black 2 dye. It is often desirable to replace the cation with which the dye is associated (usually, sodium) in order to optimize the performance of the ink for a particular ink-jet printhead. However, it should be noted that the particular ionic form is irrelevant to the practice of the invention.

For use with a 180 dpi printhead, the yellow and black dyes are first treated to replace the as-supplied sodium counter-ion on the dye with tetramethylammonium cation. The red ink is treated to replace the as-supplied sodium counter-ion on the dye with lithium. This is to prevent crusting of the printhead nozzles by the ink.

Specifically, Acid Yellow 23-Na is purified and ion-exchanged to the tetramethylammonium (TMA) form simultaneously by the method described in U.S. Pat. No. 4,685,968. The use of the TMA cation is described in U.S. Pat. No. 4,761,180. The process of forming the TMA form of the dye and its composition are thus known in the art and form no part of this invention.

The Acid Yellow 23-TMA dye is then mixed with deionized (DI) water and diethylene glycol in the following proportions:

| Acid Yellow 23-TMA | about 1 to 5 wt %; |
| diethylene glycol | about 30 to 60 wt %; and |
| water (deionized) | balance. |

Preferably, the amount of Acid Yellow 23-TMA dye is about 4 wt% for a 180 dpi printhead and the amount of diethylene glycol is 60 wt%. Since bleed occurs more at 60 wt% than at the lower concentrations of diethylene glycol, the concentration of DEG should not exceed this value.

The ink (with 4 wt% dye) made above has the following properties:

| pH | 7 |
| surface tension | >50 dyne/cm |
| density | 1.085 g/ml |
| conductivity | <2.5 mmho/cm |
| viscosity | 9.2 cp |
| Lambda maximum | 426 nm |
| dilution factor | 5000 |

Acid Red 52-Na is processed as described above to replace the sodium cations, but with lithium cations instead of TMA cations, to form Acid Red 52-Li. That is, the ion-exchange column is loaded with lithium cations and the dye concentrate poured through the column. The use of lithium cation is described in U.S. Pat. No. 4,994,110. The process of forming the lithium form of the dye and its composition are thus known in the art and form no part of this invention.

The Acid Red 52-Li dye is then mixed with deionized (DI) water and diethylene glycol in the following proportions:

| Acid Red 52-Li | about 1 to 5 wt %; |
| diethylene glycol | about 30 to 60 wt %; and |
| water (deionized) | balance. |

Preferably, the amount of Acid Red 52-Li is about 3 wt% for a 180 dpi printhead and the amount of diethylene glycol is about 60 wt%.

The ink (with 3 wt% dye) made above has the following properties:

| pH | 7 |
| surface tension | >45 dyne/cm |
| density | 1.085 g/ml |
| conductivity | <6.50 mmho/cm |
| viscosity | 7.5 cp |
| Lambda maximum | 566 nm |
| dilution factor | 10,000 |

| | -continued |
|---|---|
| absorbance | 0.50. |

Acid Blue 9-Na is purified as above and the dye concentrate is mixed with DI water and diethylene glycol to form an ink having the formulation

| Acid Blue 9-Na | about 1 to 5 wt %; |
|---|---|
| diethylene glycol | about 30 to 60 wt %; and |
| water (deionized) | balance. |

Preferably, the amount of Acid Blue 9-Na is about 3 wt% for a 180 dpi printhead and the amount of diethylene glycol is about 60 wt%.

The ink (with 3 wt% dye) made above has the following properties:

| pH | 7 |
|---|---|
| surface tension | 53 dyne/cm |
| density | 1.1 g/ml |
| conductivity | 1.06 mmho/cm |
| viscosity | 5.1 cp |
| Lambda maximum | 630 nm |
| dilution factor | 5000 |
| absorbance | 1.02. |

Using the inks from above on a 180 dpi thermal ink-jet printer, special coated paper was printed on. The inks cannot be printed easily on transparency (mylar), even though the color gamut is quite favorable for the ink set, due to objectionable fading of the red color with time on mylar.

The sole Figure shows the color gamut comparison on Munsell coordinates as a result of printing the dye set of the prior art (Curve 10) and the dye set of the invention (Curve 12) on special coated paper used with the PaintJet ® printer. The radius measures chroma, while the angle measures hue.

It is readily seen that the dye set of the invention can reproduce a larger number of colors than a dye set of the prior art, comprising Direct Yellow 86, Direct Red 227, and Acid Blue 9. The inks of the invention show a measurable improvement in the red (R), yellow (Y), green (G), and magenta (M) regions, with comparable performance elsewhere. That is, all colors are truer, and in many instances, chroma is increased. In this Figure, B is blue and C is cyan.

Specifically, the goal of 5 R for red hue is nearly met at 4 R with a chroma of 12, which compares to the current PaintJet ® ink of 3 RP with a chroma of 14. The correct hue yields a very good red. The blue hue moved slightly from the value of 8 PB to 9 PB, but chroma increased from 11 to 18. This is a major improvement, because total color gamut is proportional to the square of the chroma. Red and blue completely define the cyan-yellow-magenta set, but a good green is also required. The dye set of the invention yields a 3 G with a chroma of 9, as compared to the current PaintJet ® ink set hue of 4 G with a chroma of 9. Yellow moved slightly to 3 Y with a chroma of 13, compared with the current PaintJet ® yellow at 4 Y with a chroma of 12.

The black and cyan inks remain exactly the same; the yellow and magenta inks use different dyes while retaining a desired vehicle comprising 40 wt% water and 60 wt% diethylene glycol. Bleed has increased somewhat because the dyes used in the present application have a greater mobility. However, this is not considered to be objectionable in view of the improvement in color.

The dye set of the invention is intended for use on 180 dpi thermal ink-jet printers, and will work on higher resolution printers, such as 300 DPI printers.

The advantages provided by the dye set of the invention include (1) improved color gamut and (2) primary and secondary colors are bright and true.

A black ink is used in conjunction with the foregoing color ink set, rather than using composite ink (a combination of the three inks simultaneously to produce black color). For the black ink, Food Black 2-Na is purified and ion-exchanged to the TMA form, using the method described in U.S. Pat. No. 4,786,327. The use of the TMA cation is described in U.S. Pat. No. 4,761,180. The process of forming the TMA form of the dye and its composition are thus known in the art and form no part of this invention.

The Food Black 2-TMA dye is then mixed with DI water and diethylene glycol in the following proportions:

| Food Black 2-TMA | about 0.5 to 5 wt %; |
|---|---|
| diethylene glycol | about 30 to 60 wt %; and |
| water | balance. |

Preferably, the amount of Food Black 2-TMA dye is about 5 wt% for a 180 dpi printhead and the amount of diethylene glycol is 60 wt%.

INDUSTRIAL APPLICABILITY

The specific dye set disclosed herein is expected to find commercial use in thermal ink-jet printers having at least 180 dpi capability.

What is claimed is:

1. A set of thermal ink-jet inks comprising a yellow ink containing a yellow dye, a magenta ink containing a magenta dye, and a cyan ink containing a cyan dye for thermal ink-jet printers having at least 180 dpi print capability, said yellow ink having the formula

| Acid Yellow 23 | about 1 to 5 wt % |
|---|---|
| diethylene glycol | above 30 to about 60 wt % |
| water | balance, | said magenta ink having the formula

| Acid Red 52 | about 1 to 5 wt % |
|---|---|
| diethylene glycol | above 30 to about 60 wt % |
| water | balance, and | said cyan ink having the formula

| Acid Blue 9 | about 1 to 5 wt % |
|---|---|
| diethylene glycol | above 30 to about 60 wt % |
| water | balance. |

2. The set of thermal ink-jet inks of claim 1, further comprising a black ink containing a black dye, said black ink having the formula

| Food Black 2 | about 0.5 to 5.0 wt % |
|---|---|
| diethylene glycol | above 30 to about 60 wt % |

| | |
|---|---|
| water | balance. |

3. The set of thermal ink-jet inks of claim 1, said yellow ink having the formula

| | |
|---|---|
| Acid Yellow 23-TMA | about 4 wt % |
| diethylene glycol | about 60 wt % |
| water | balance, | said magenta ink having the formula

| | |
|---|---|
| Acid Red 52-Li | about 3 wt % |
| diethylene glycol | about 60 wt % |
| water | balance, and | said cyan ink having the formula

| | |
|---|---|
| Acid Blue 9-Na | about 3 wt % |
| diethylene glycol | about 60 wt % |
| water | balance, | where TMA indicates the tetramethylammonium cation associated therewith, Li indicates the lithium cation associated therewith, and Na indicates the sodium cation associated therewith.

4. The set of thermal ink-jet inks of claim 3 further including a black ink having the formula

| | |
|---|---|
| Food Black 2-TMA | about 5 wt % |
| diethylene glycol | about 60 wt % |
| water | balance. |

5. A method for color printing using a thermal ink-jet printer having at least 180 dpi print capability, comprising printing from a set of thermal ink-jet inks comprising a yellow ink containing a yellow dye, a magenta ink containing a magenta dye, and a cyan ink containing a cyan dye, said yellow ink having the formula

| | |
|---|---|
| Acid Yellow 23 | about 1 to 5 wt % |
| diethylene glycol | above 30 to about 60 wt % |
| water | balance, | said magenta ink having the formula

| | |
|---|---|
| Acid Red 52 | about 1 to 5 wt % |
| diethylene glycol | above 30 to about 60 wt % |
| water | balance, and | said cyan ink having the formula

| | |
|---|---|
| Acid Blue 9 | about 1 to 5 wt % |
| diethylene glycol | above 30 to about 60 wt % |
| water | balance. |

6. The method of claim 5, wherein said set of thermal ink-jet inks further comprises a black ink which contains a black dye, said black ink having the formula

| | |
|---|---|
| Food Black 2 | about 0.5 to 5.0 wt % |
| diethylene glycol | above 30 to about 60 wt % |
| water | balance. |

7. The method of claim 5, wherein said yellow ink has the formula

| | |
|---|---|
| Acid Yellow 23-TMA | about 4 wt % |
| diethylene glycol | about 60 wt % |
| water | balance, | said magenta ink has the formula

| | |
|---|---|
| Acid Red 52-Li | about 3 wt % |
| diethylene glycol | about 60 wt % |
| water | balance, and | said cyan ink has the formula

| | |
|---|---|
| Acid Blue 9-Na | about 3 wt % |
| diethylene glycol | about 60 wt % |
| water | balance, | where TMA indicates the tetramethylammonium cation associated therewith, Li indicates the lithium cation associated therewith, and Na indicates the sodium cation associated therewith.

8. The method of claim 7 further including a black ink having the formula

| | |
|---|---|
| Food Black 2-TMA | about 5 wt % |
| diethylene glycol | about 60 wt % |
| water | balance. |

* * * * *